No. 729,226.　　　　　　　　　　　　　　　　PATENTED MAY 26, 1903.
C. E. SHAFFER & G. B. JOHNSON.
HOOF TRIMMER.
APPLICATION FILED MAY 31, 1901.
NO MODEL.
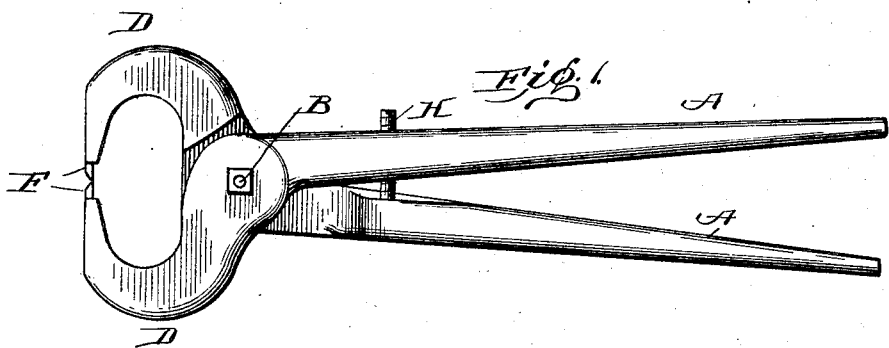
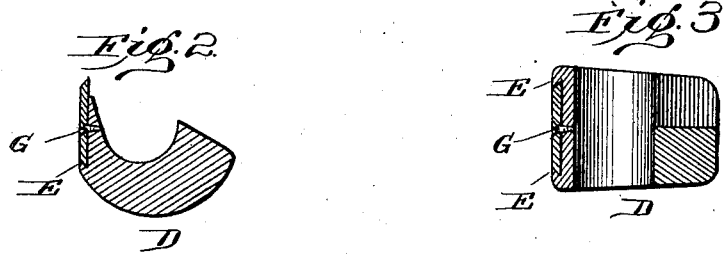
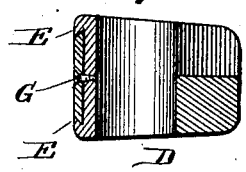
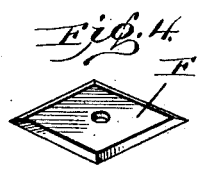

No. 729,226. Patented May 26, 1903.

UNITED STATES PATENT OFFICE.

CHARLES E. SHAFFER AND GEORGE B. JOHNSON, OF QUINCY, ILLINOIS; SAID JOHNSON ASSIGNOR TO SAID SHAFFER.

HOOF-TRIMMER.

SPECIFICATION forming part of Letters Patent No. 729,226, dated May 26, 1903.

Application filed May 31, 1901. Serial No. 62,640. (No model.)

*To all whom it may concern:*

Be it known that we, CHARLES E. SHAFFER and GEORGE B. JOHNSON, of Quincy, in the county of Adams, State of Illinois, have invented certain new and useful Improvements in Hoof-Trimmers; and we do hereby declare the following to be a full, clear, and exact description of the same, reference being had to the accompanying drawings, forming a part of this specification, and to the letters of reference marked thereon.

This invention relates to improvements in implements for cutting or trimming horses' hoofs preparatory to the fitting of new shoes, and has for its object to provide an implement of this kind in which the cutting-blades are formed with a plurality of cutting edges, which may be used successively as needed, thus rendering frequent sharpening unnecessary, and the cutting edges not in use will be protected from injury.

To these ends the invention consists in certain novel details of construction and combinations and arrangements of parts, all as will be now described, and the particular features of novelty pointed out in the claim.

Referring to the accompanying drawings, Figure 1 is a side elevation of the device embodying our invention. Fig. 2 is a longitudinal section through one of the jaws. Fig. 3 is a cross-sectional view of the same. Fig. 4 is a detail view of one of the cutting-blades.

Similar letters of reference in the several figures indicate the same parts.

In the drawings the letter A represents handles, of any preferred form, pivoted together in the ordinary manner, as by the pivot or bolt B. The upper end portions of the handles A are formed into the jaws D, preferably curved outwardly, as shown, and flattened on the top or outer surfaces. Within the top of the jaws is formed a recess, preferably rectangular, having the overhanging edges E, and within the recess is received the cutting-blade F.

As shown in Fig. 4, the blades F are preferably rectangular in shape and beveled on all four sides to form cutting edges, and when the blade is in position in the jaw it will be noted that the cutting edges which are not in use will fit under the overhanging edges E of the recess in the jaws. The blades are thus held firmly in place and are prevented from working out upwardly, while screws G or other fastening means assist also in this.

It will now be understood that as the cutting edges of the blades wear out or become dull it is simply necessary to remove the retaining-screw and bring one of the other cutting edges into position for cutting, thus dispensing with the necessity of frequent sharpening, as in the case of blades with but a single cutting edge. So, too, the cutting edges will be protected from injury when not in use.

In case the blades in one jaw are more worn than those of the other, or if for any other reason the blades do not come close enough for cutting, the screw H, carried in one of the handles, may be turned to permit the handles to come closer together, as will be readily understood.

While we have described the invention as designed for trimming horses' hoofs, it will of course be understood that it is not limited to this class of device.

Having thus described our invention, what we claim as new, and desire to secure by Letters Patent, is—

In a hoof-trimmer, the combination with the outwardly-curved coöperating jaws flattened on the outer surfaces each having the rectangular-shaped recess therein with overhanging edges on three of its sides, of rectangular-shaped blades beveled to form cutting edges on all four sides adapted to be received in said recesses, whereby the blades will be held by the overhanging edges of the recesses, leaving the outer surfaces of the jaws smooth and flat, said overhanging edges protecting the edges of the blade not in use; substantially as described.

CHARLES E. SHAFFER.
GEORGE B. JOHNSON.

Witnesses:
FRANCES ARGO,
L. E. EMMONS, Jr.